United States Patent [19]
Kitada

[11] 3,948,086
[45] Apr. 6, 1976

[54] PULSE REFLECTION TYPE ULTRASONIC THICKNESS METER

[75] Inventor: Toyohiko Kitada, Sagamihara, Japan

[73] Assignee: Kabushikikaisha Tokyo Keiki, Tokyo, Japan

[22] Filed: Oct. 3, 1973

[21] Appl. No.: 403,101

[30] Foreign Application Priority Data
Oct. 10, 1973 Japan.............................. 48-101352

[52] U.S. Cl. ................................................. 73/67.7
[51] Int. Cl.² .......................................... G01B 17/02
[58] Field of Search................ 73/67.7, 67.8 R, 67.9

[56] References Cited
UNITED STATES PATENTS
3,605,504   9/1971   Kummer, Jr. et al................ 73/67.7

*Primary Examiner*—Charles A. Ruehl
*Attorney, Agent, or Firm*—Hill, Gross, Simpson, Van Santen, Steadman, Chiara & Simpson

[57] ABSTRACT

A pulse reflection type ultrasonic thickness meter having an ultrasonic transducer which supplies an ultrasonic pulse wave to an object to be measured and receives an echo pulse from the object and a counter which counts the time difference between the transmission of the ultrasonic pulse wave and the echo pulse. In this case, a switching circuit is provided which controls the counter in such a manner that a power source is disconnected from the counter during a non-measurement time period.

1 Claim, 4 Drawing Figures

PULSE REFLECTION TYPE ULTRASONIC THICKNESS METER

BACKGROUND OF THE INVENTION

1. Field of the Invention

The present invention relates generally to a pulse reflection type ultrasonic thickness meter and more particularly to a pulse reflection type ultrasonic thickness meter in which a specific switching means is provided to control a counter circuit therein to avoid waste of power.

2. Description of the Prior Art

In the prior art ultrasonic thickness meters, electrical power is wasted.

SUMMARY OF THE INVENTION

It is an object of this invention to provide a pulse relfection type ultrasonic thickness meter for measuring the thickness of an object in a digital manner with small power consumption.

The other objects, features and advantages of the present invention will become apparent from the following description taken in conjunction with the accompanying drawing.

DESCRIPTION OF THE PREFERRED EMBODIMENT

An example of this invention will be hereinbelow described with reference to the drawings.

Figure 1:
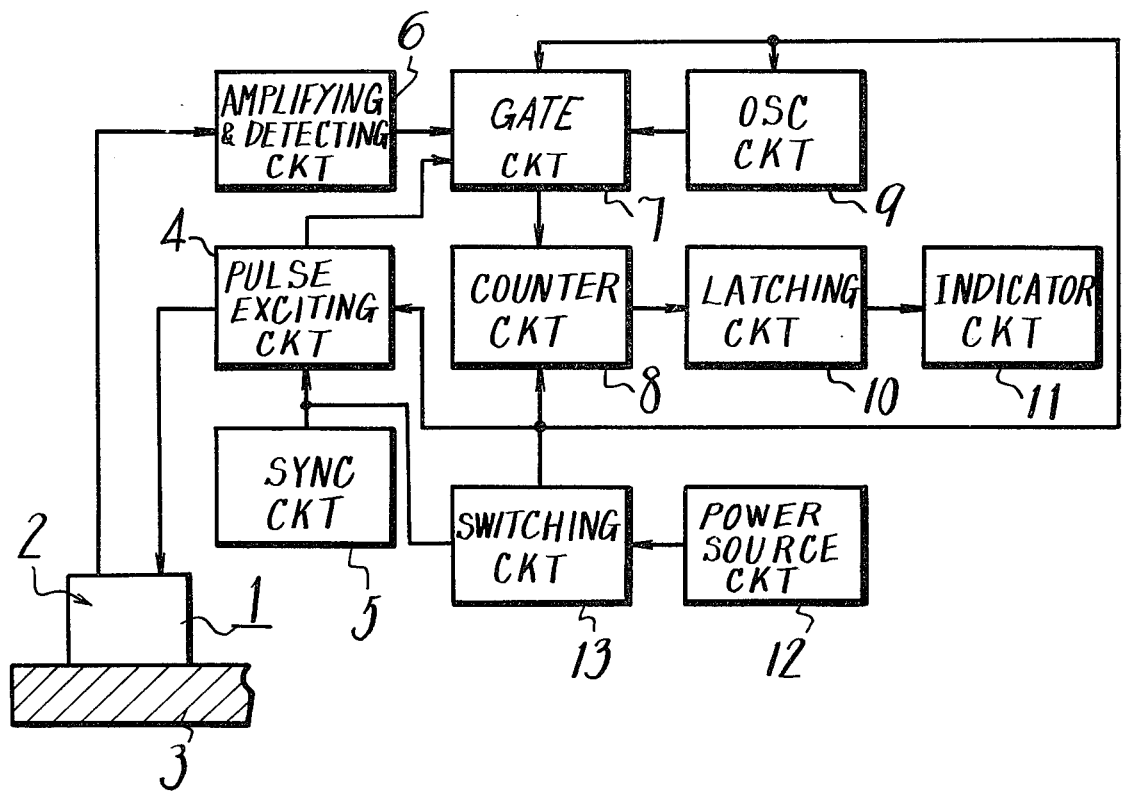
FIG. 1 is a block diagram showing an example of a digital ultrasonic thickness meter according to this invention.

FIG. 1 illustrates one example of an ultrasonic thickness meter of this invention. Reference numeral 1 indicates an ultrasonic transducer, that is, a probe, which comprises a transmitter and a receiver (both not shown) disposed in a housing 2 and electrically and acoustically isolated from each other, as is well-known. Reference numeral 3 designates a member or object whose thickness is to be measured. The transmitter has connected thereto a pulse exciting circuit 4, which, in turn, has connected thereto a synchronous circuit 5. A received wave amplifying and detecting circuit 6 is connected to the output stage of the receiver which receives ultrasonic waves transmitted from the transmitter. The received signal (a reflected echo) amplified as desired is supplied to a gate circuit 7 and an output signal constituted by clock pulses therefrom corresponding to the difference in time determined by the gated circuit 7 is supplied to a counter circuit 8, in which the output signal is converted into the thickness of the member 3 to be measured. Reference numeral 9 identifies an oscillator circuit which supplies a clock signal for controlling the gate circuit 7.

The signal converted by the counter circuit 8 represents the thickness of the member 3 and is applied through a latching memory circuit 10, serving as a self-maintaining memory, to an indicator circuit 11 for indicating the thickness in digital form. Thus, the thickness of the member 3 can be directly read out at the indicator circuit 11.

The construction described above is well-known in the art.

Figure 2A:
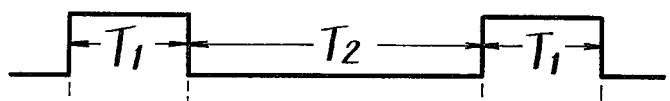
FIGS. 2A, 2B and 2C are respectively waveforms diagrams used for explaining the operation of the thickness meter shown in FIG. 1.
Figure 2B:
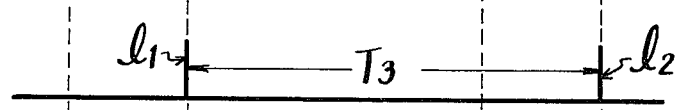

With such an ultrasonic thickness meter, the time $T_1$ for measuring the thickness of the member 3 in practice is from times $t_1$ to $t_2$ as shown in FIG. 2A and the sampling period until the next period after the application of the measured data to the latching memory circuit 10, that is, the time from the time $t_2$ to $t_3$ is not used for the measurement and is a dead time. Assuming that the frequency of the signal obtained from, for example, the pulse exciting circuit 4 is 1KHz and that the thickness measurement is achieved for 10 periods, the time $T_1$ during the measurement including the time for processing the measured data is about 0.01 seconds. However, the time not used for the measurement, that is, the non-measuring time period $T_2$ (from $t_2$ to $t_3$) is usually in the range from 0.1 to 1 second or so because if the time period $T_3$ for indicating the measured data is shortened, the output being displayed cannot be read. Therefor, the same message is displayed for the time period $T_3$ as shown in FIG. 2B. Lines $l_1$ and $l_2$ corresponding to the instants $t_2$ and $t_4$ indicate the display changeover points. Accordingly, the indicator circuit 11 is always operative during the indication time period $T_3$ but some of the circuits do not serve for the measuring operation during the non-measurement time period $T_2$ although they are supplied with power during this time. In arrangement in FIG. 1, the counter circuit 8, the gate circuit 7, the oscillator circuit 9 and the pulse exciting circuit 4 are held inoperative. Since the counter circuit 8 is required to be driven at high speed, its power consumption is fairly large.

With the present invention, the power supplied to the aforementioned circuits which remain substantially inoperative during the measured data sampling period (the non-measurement $T_2$) is discontinued. As shown in FIG. 1, a switching circuit 13 is connected to the output stage of a power source circuit 12 and the power source voltage derived from the power source circuit 12 is intermittently supplied to the aforementioned circuits 4, 7, 8 and 9 through the switching circuit 13. The other circuits are directly supplied voltage from power source circuit 12 as usual.

Figure 2C:
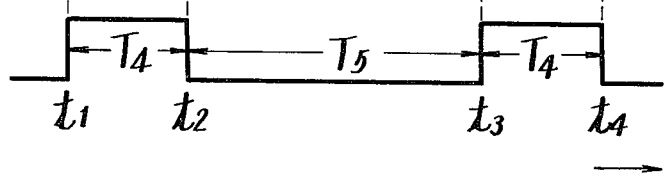

With the above arrangement, as shown in FIG. 2C, during the measurement time period $T_1$ the power source voltage is supplied through the switching circuit 13 and this period becomes a conduction time period $t_4$ ($t_1 = T_4$), while during the non-measurement time period $T_2$ the power source voltage is not supplied due to the switching circuit 13 and this period becomes a non-conduction time period $T_5$ ($T_5 = T_2$) during which the circuits are made inoperative. Consequently, in the nonconduction time period $T_5$, the power consumption of the circuits 4, 7, 8 and 9 is zero so that the power consumption of the circuits operated through the switching circuit 13 can be reduced to 1/30 ~ 1/100 of what it was in prior art devices where $t_1 = 0.01$ sec. and $T_2 = 0.3 \sim 1$ sec. As a result, the power consumption of the thickness meter of this invention during continuous use can be reduced to substantially less than one half as compared with power consumed by conventional ultrasonic thickness meters which do not have the switching circuit 13. Especially, in a portable miniaturized ultrasonic thickness meter, the service life of the power source (a battery) can be increased by more than a factor of two. Thus, the ultrasonic thickness meter of this invention is very economical.

Although this invention has been described in connection with the example in which the operating power source is intermittently supplied to the circuit system including the counter circuit 8 it will be seen that the invention is also applicable to a system which differs from that shown in FIG. 1 and that many modifications and variations may be effected without departing from the scope of the novel concepts of this invention.

Further, the switching circuit 13 may be controlled by, for example, one part of the output from the synchronous circuit 5 or with the output from the pulse exciting circuit 4.

I claim as my invention:

1. A pulse reflection type ultrasonic thickness meter, comprising:
   a. a pulse exciting circuit;
   b. an ultrasonic transducer controlled by said pulse exciting circuit to transmit ultrasonic pulses into an object whose thickness is to be measured and receive echo pulses from said object;
   c. an oscillator circuit for producing clock pulses;
   d. a gate circuit connected to receive the echo pulses and clock pulses;
   e. a counter circuit connected to receive and count clock pulses passing through the gate circuit corresponding to the time difference between the transmitted and received pulses;
   f. an indicator circuit connected to receive an output of said counter circuit and indicate the thickness of said object; and
   g. a switching circuit operating in synchronism with said pulse exciting circuit and disposed between an electrical power source and at least one of said counter circuit, pulse exciting circuit, oscillator circuit and gate circuit to connect said power source thereto during a measuring time period in which the ultrasonic transducer transmits the transmitted pulse and receives echo pulses and said counter circuit counts the clock pulses passing through said gate circuit and disconnects the power source therefrom during a subsequent sampling time period in which the indicator circuit receives the output of said counter circuit and indicates the thickness of said object.

* * * * *